Figure 1:
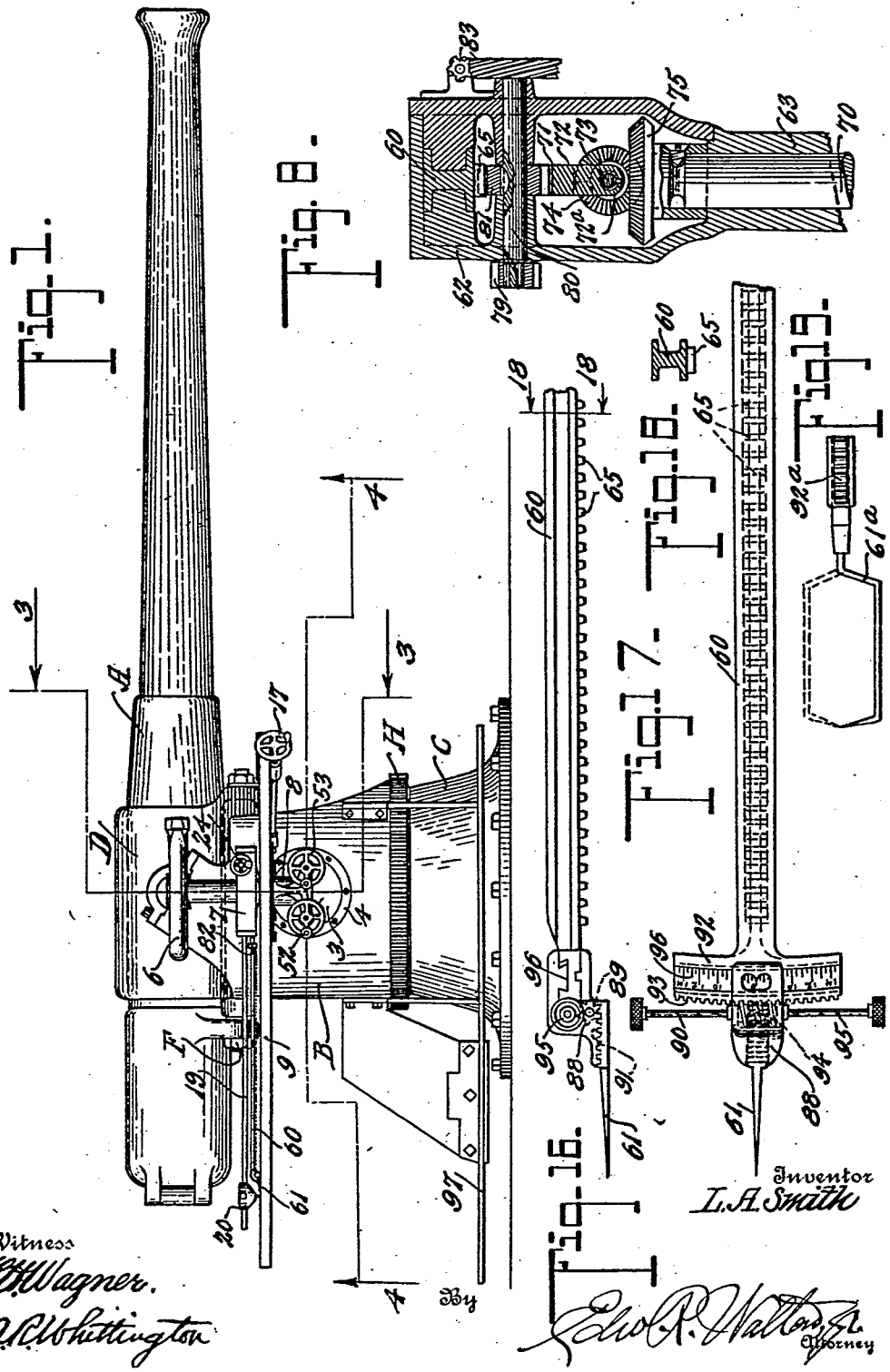

L. A. SMITH.
COMBINED RANGE FINDING, PLOTTING, PREDICTING, AND GUN ADJUSTING DEVICE.
APPLICATION FILED AUG. 1, 1917.

1,346,430.

Patented July 13, 1920.

6 SHEETS—SHEET 6.

Witness
E. H. Wagner.
A. R. Whittington

Inventor
L. A. Smith

By Elmer R. Walton
Attorney

UNITED STATES PATENT OFFICE.

LEONARD A. SMITH, OF THE UNITED STATES ARMY, ASSIGNOR OF ONE-HALF TO ANDREW H. CANNON, OF WASHINGTON, DISTRICT OF COLUMBIA.

COMBINED RANGE-FINDING, PLOTTING, PREDICTING, AND GUN-ADJUSTING DEVICE.

1,346,430.     Specification of Letters Patent.     Patented July 13, 1920.

Application filed August 1, 1917. Serial No. 183,956.

*To all whom it may concern:*

Be it known that I, LEONARD A. SMITH, a citizen of the United States, and an officer in the United States Army, have invented certain new and useful Improvements in Combined Range-Finding, Plotting, Predicting, and Gun-Adjusting Devices, of which the following is a specification.

The present invention relates to range finding, course plotting and range predicting devices.

In the present systems of range-finding, plotting and predicting, there is a great amount of time consumed and lost in, first, observing the target; then, communicating the observations to the plotting-room where the course or position of the target is plotted and calculated, and the range for setting the guns is predicted; and, communicating the predicted range to the gunner who must then, in return, adjust the gun to the proper predicted range. By such methods, a minimum of about twenty seconds, allowing for the travel of the shell, are consumed between the last observation and arrival of the shell to the predicted point. This lapse of time, which in most instances is greater, often gives the target sufficient time to change its course from the predicted one, consequently, rendering the first calculations ineffective and requiring new calculations to be made and the firing of numerous volleys before actually hitting the target. In some instances, the target succeeds in so diverting its course until completely out of the range of the gun.

The object of this invention is the provision of a simple and compact range-finding, plotting and predicting mechanism to be attached or embodied in the construction of a gun for controlling its adjustment and whose sequence of operation is so interwoven with the adjusting operation of the gun as to reduce to zero the lapse of time from the last observation to the time the projectile leaves the gun, thereby avoiding the disadvantages, above enumerated, of the present systems.

It is also an object of the invention to totally eliminate mental calculation so as to reduce the operator's duties to simply mechanical manipulations in order to facilitate the spontaneous operation of the various parts and to obviate mistakes which frequently occur in the heat and excitement of battle and which might not otherwise arise.

A further object of the invention is to increase the present effective or accurate battle range of naval guns.

With these ends in view, the invention broadly consists, first, of mechanism to simultaneously find and directly indicate the position or plot of the course of the target; second, of coöperating means to predict the range of the target; third, of mechanism including a gun-arm to coincide with the predicted range and cause the adjustment of the gun in proper ratio; and fourth, of mechanism for effecting the synchronous operation of the aforesaid mechanisms and the adjustment of the gun, whereby the latter may be constantly set in position to fire effectively simultaneously with each observation.

The invention also contemplates the provision of novel means for indicating or recording the position or course of the target upon the plotting-board in units of time; and, further, the provision of novel means to allow for windage and refraction of light.

Other objects and features of the invention will be apparent from the following description read in connection with the accompanying drawings and in which the specific construction, combination and arrangement of parts are set forth and finally pointed out in the appended claims.

In the drawings which disclose a mechanism embodying the principles of the invention:—

Figure 2:
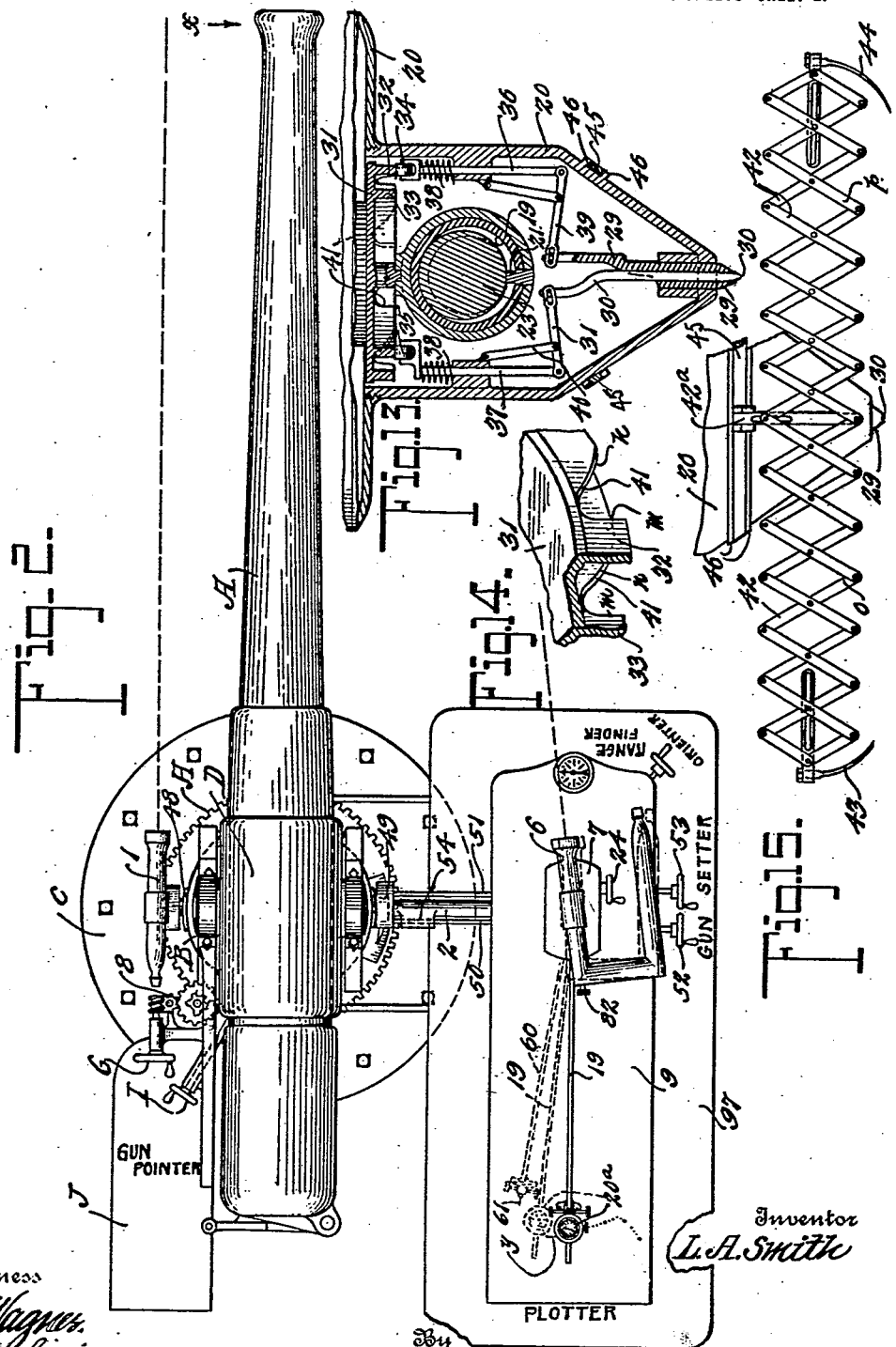
Figure 3:
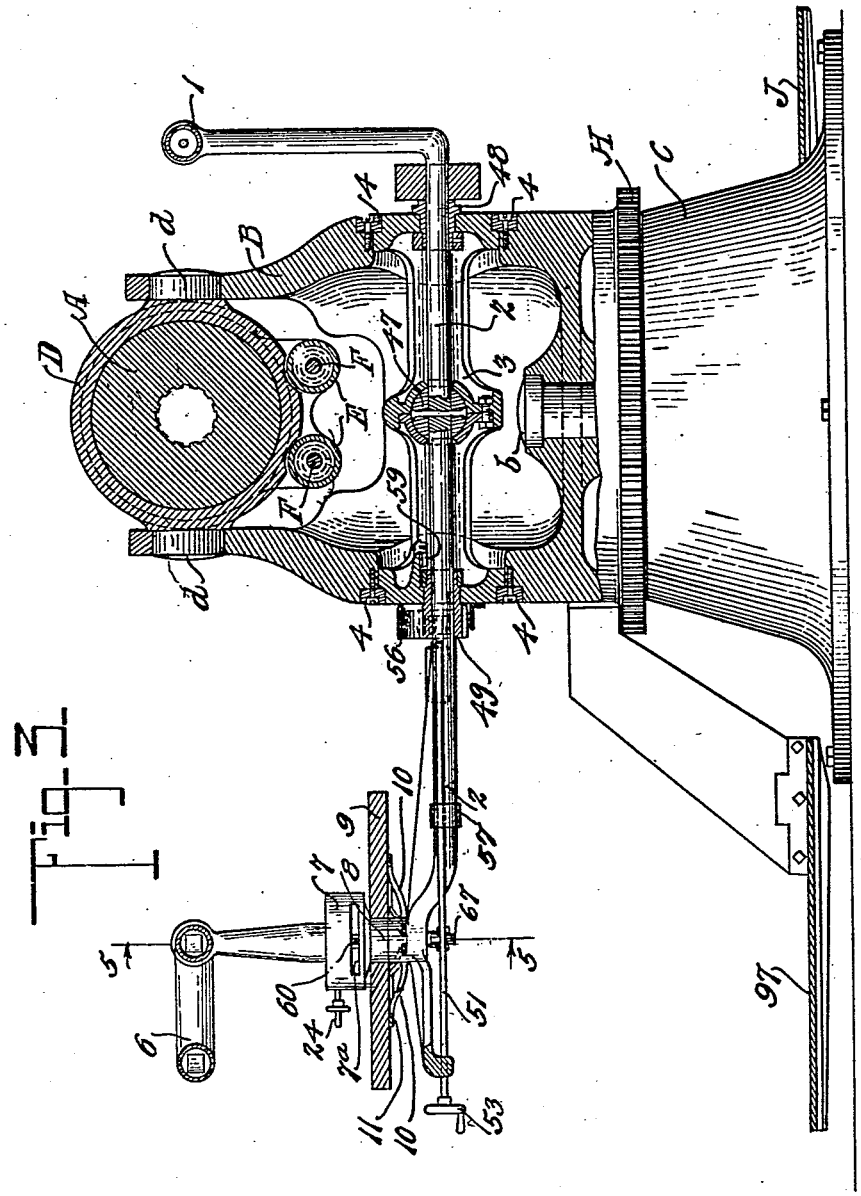
Figure 4:
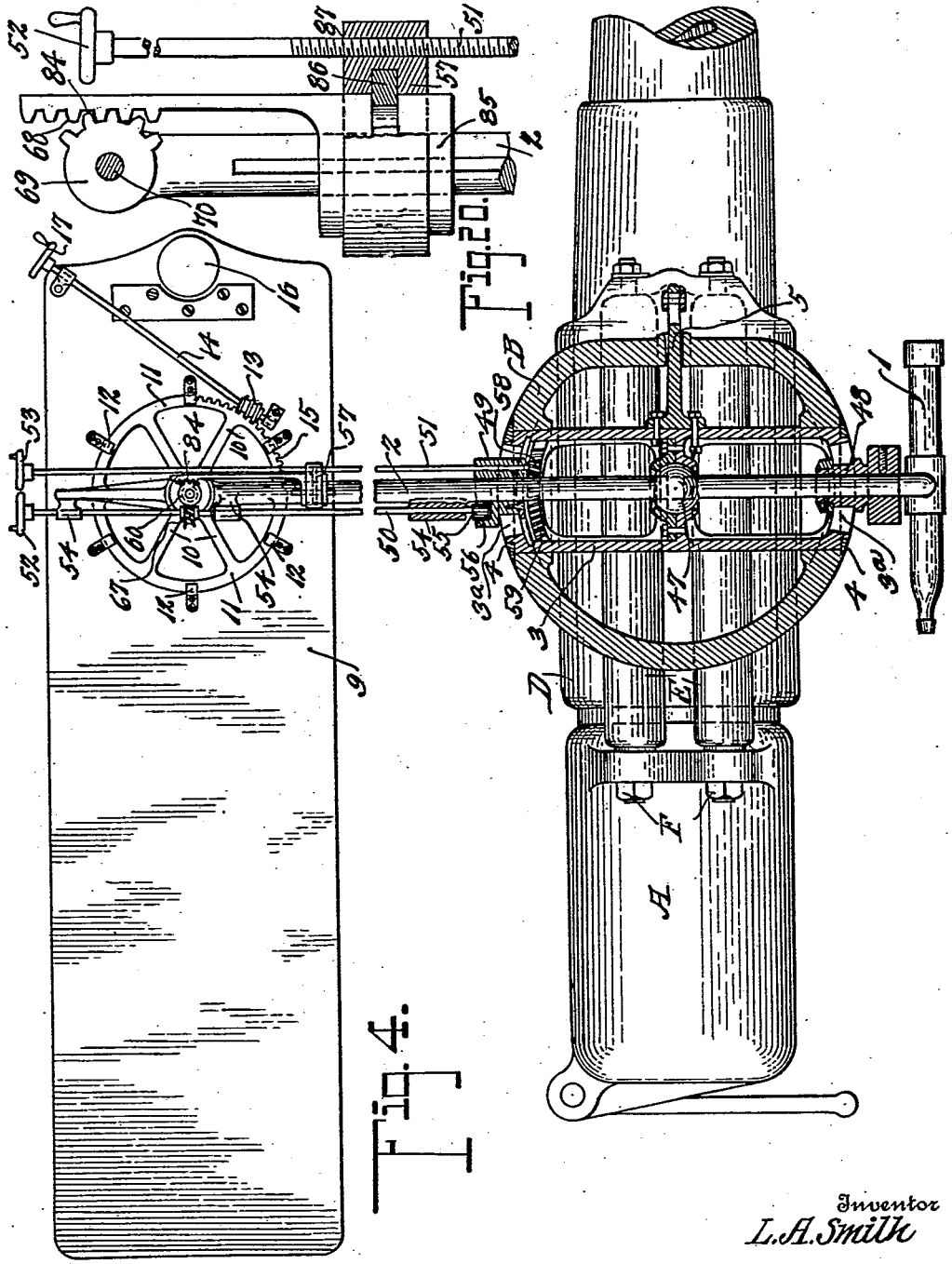
Figure 5:
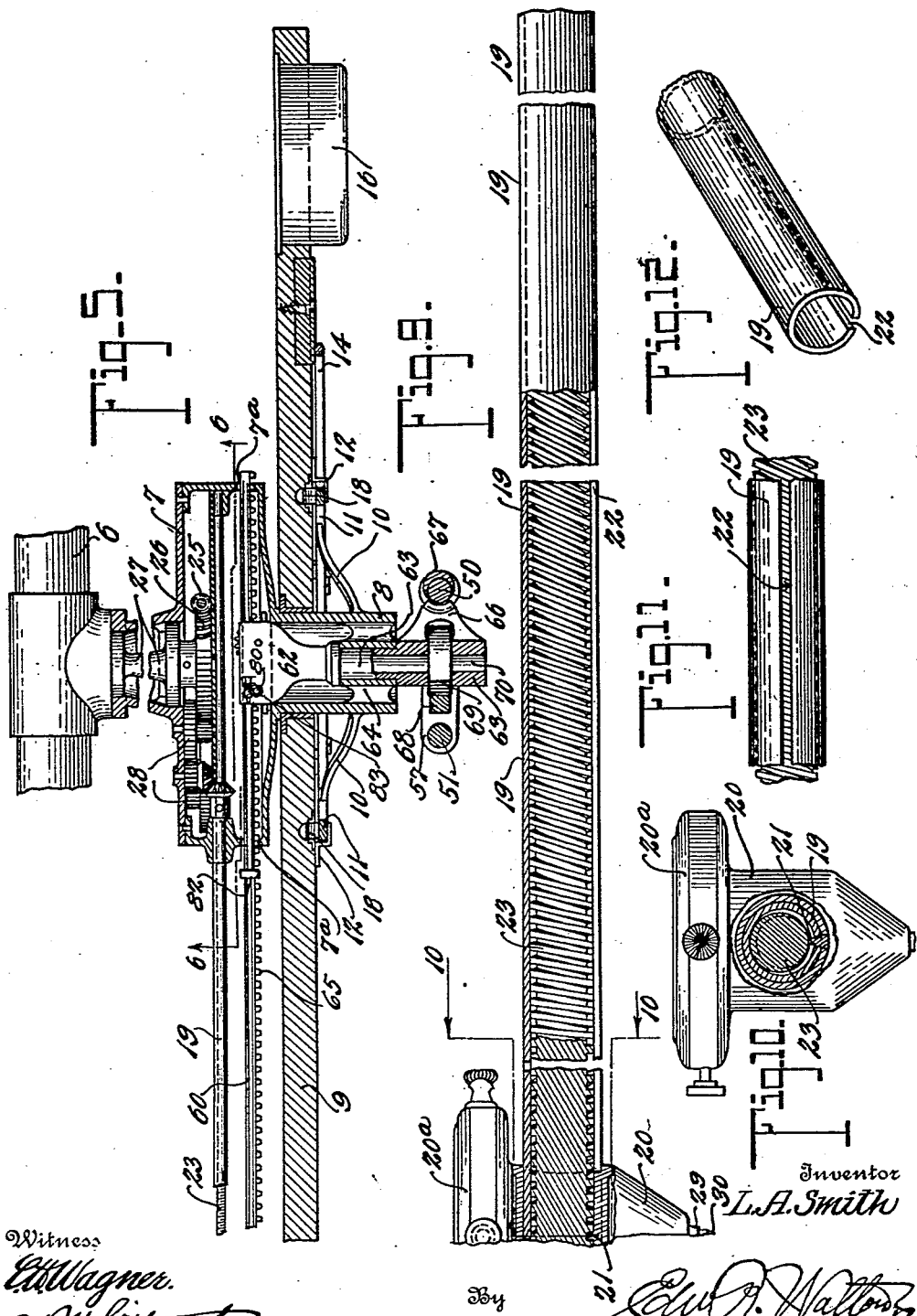
Figure 6:
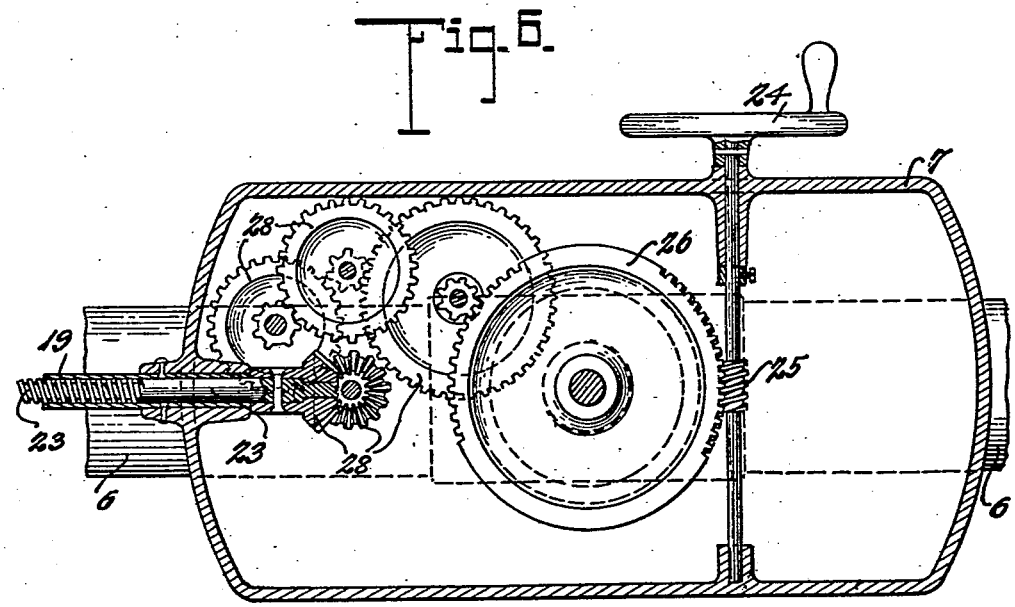

Figure 1 is a side elevation of a gun and gun-mount equipped with the present invention, Fig. 2 is a top-plan view of Fig. 1, Fig. 3 is a vertical, transverse sectional view of the gun, gun-mount and range finding mechanism taken substantially on line 3—3 of Fig. 1, Fig. 4 is an under view taken on line 4—4 of Fig. 1, Fig. 5 is an enlarged fragmentary sectional view taken substantially on line 5—5 of Fig. 3, illustrating the mechanism for operating the indicator's-arm, and the gun-arm; and, also illustrating their relative position and the manner in which the plotting-board is mounted, Fig. 6 is an underview of the mechanism for operating the range-finder's telescope and the indicator-arm and is taken substantially on line 6—6 of Fig. 5.

Figure 7:
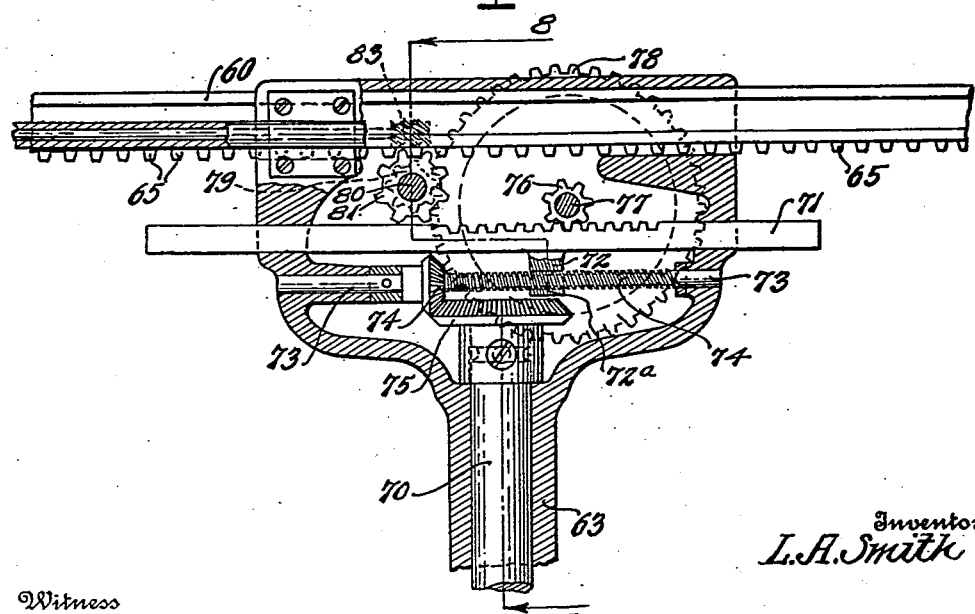

Fig. 7 is a vertical sectional view of the mechanism, shown under the indicator-arm in Fig. 5, for transmitting longitudinal movement to the gun-arm, and taken at right-angles to Fig. 8, Fig. 8 is a vertical sectional view of the mechanism shown in Fig. 7 and taken substantially on line 8—8 of Fig. 7, Fig. 9 is an enlarged fragmentary side elevation of the indicator-arm with portions broken away to show the detail construction and also showing the indicator mounted thereon, Fig. 10 is a transverse section taken substantially on line 10—10 of Fig. 9, and showing the indicator mounted on the indicator-arm, Fig. 11 is a fragmentary under view of the indicator-arm shown in Fig. 9, Fig. 12 is a fragmentary detail perspective of the sleeve which surrounds the rotating rod of the indicator-arm, Fig. 13 is a transverse sectional view of the indicator device for marking or perforating the course of the target, Fig. 14 is a fragmentary detail perspective of the cam wheel which is actuated by a clock mechanism to operate the marking or perforating members, Fig. 15 is a side elevation of an expansible and flexible measuring device contemplated by the invention for use in connection with the indicator, Fig. 16 is a fragmentary side elevation of the gun-arm equipped with a pointer and novel mechanism for adjusting the pointer to compensate for windage and refraction of light, Fig. 17 is a plan of the mechanism shown in Fig. 16, Fig. 18 is taken on 18—18 of Fig. 16, Fig. 19 shows a modified construction of pointer of the gun-arm, and Fig. 20 is a detail view of a gearing for transmitting motion to the gun-arm.

Like characters denote similar and like parts throughout the specification and drawings.

The mechanism according to the invention is particularly adapted for use with naval guns, however, it can be used to advantage with coast defense and artillery guns.

For present purposes the invention is shown applied to a naval gun A supported by the usual mounting B rotatably mounted on the usual base C, the mounting B including the recoil-sleeve D pivotally mounted on its trunnions $d$ for vertical movement and having the gun A slidably mounted therein. The recoil-cylinders E are secured to the recoil-sleeve and the gun A has connection with the plungers F in the recoil-cylinders. The mounting B is rotatable about its vertical pivot $b$ to effect horizontal adjustment of the gun. This adjustment is accomplished by operating a crank-handle G, mounted on the mounting B, and which actuates a gearing $g$ in mesh with stationary gear H secured to the base C. Elevations and depressions of the gun are effected in the usual manner by an operation of a crank-handle I connected with suitable mechanism, not shown, which rotates the gun vertically on its trunnions $d$. The wheels G and I are operated by the gun-pointer stationed on the platform J movable with the gun-mounting B, and the wheels may be operated in unison to obtain a simultaneous horizontal and vertical adjustment of the gun. It is to be understood however, that the gun and gun-mount here shown and described are only for the purpose of illustrating the invention as applied and to facilitate an understanding of its operation, as the invention is adaptable to guns and gun-mounts of other constructions.

The range-finding device according to the invention includes a gun-pointer's telescope 1, which, for the present, is to be considered as having its line of sight parallel to the gun. The telescope 1 is rigidly supported and carried on one end of a rigid horizontal carrying-arm 2 extending at right-angles to the line of the sight of the telescope to form the base of a right-angle triangle. The base or carrying-arm 2 is supported by and movable with the gun-mounting B (Figs. 1 to 4) so that any rotation of the latter, which would affect the horizontal adjustment of the gun, will correspondingly adjust the line of sight of the telescope 1. To permit the telescope 1 to be elevated and depressed correspondingly with the elevation and depression of the gun, the carrying arm 2 is extended through and is mounted in a sleeve 3 journaled in the gun-mounting B and held in position by the retaining rings 4, the sleeve having a positive connection with the gun by a link 5 (Fig. 5) which will rotate the sleeve correspondingly with the movement of the gun on its trunnions.

The range-finder's telescope 6 is mounted for horizontal pivotal movement on the opposite end of the carrying-arm, preferably at the side of the gun opposite the telescope 1, and its line of sight is the hypotenuse of the right-angle triangle, above mentioned. This telescope 6 may be mounted in any manner that will permit the proper and accurate operation of the invention, but according to the present embodiment is mounted on a gear-box 7 rigid on the carrying-arm and has its pivot in vertical alinement with the carrying-arm. The gear-box is carried on the upper end of a rigid tubular extension 8 extending upwardly from said end of the carrying-arm.

A plotting-board is rotatably mounted about the extension 8 and is held in a horizontal plane immediately below the gear-box 7 by spider-arms 10 rigid with the extension and carrying at their extremities the annular track 11, which is embraced by the clips 12 on the board to prevent rattling and excess loose movement of the board (Figs. 4 and 5). Since the plotting-board is rotatably mounted on the extension 8, it permits of orientation; and, this may be accomplished by a worm 13 on a crank-shaft 14 journaled on the undersurface of the board (see Fig. 4) and meshing with teeth 15 on the fixed track 11. The plotting board is provided with a gyroscopic-compass 16, at some point adjacent the crank-handle 17 which actuates the shaft 14. It is, of course, understood that one man is stationed at the crank-handle 17, whose duty it is to keep the plotting-board oriented relative to a selected point on the compass 15 so that tossing and drifting of the ship will not affect the proper map position, which is to be indicated, of the target relative to the ship. To facilitate a free and easy movement of the plotting-board, anti-friction rollers 18, may be interposed between the board and the track 11. The plotting-board may be either round or oblong, as may be found best in practice, and may have either a plain or scaled record sheet or map, of suitable material, removably secured on its upper surface.

An indicator-arm 19 extends from the gear-box and carries an indicator 20 to record or otherwise indicate the position of target on the map. This map is so positioned on the plotting-board relative to the indicating-arm that an accurate plotting of the target is obtained through a proper operation of the indicator 20. The indicating-arm 19, preferably, consists of a tubular extension or sleeve (Figs. 9, 11 and 12) rigidly mounted on the gear-box 7 and extending rearwardly therefrom to lie spaced and substantially parallel with the board 9 and at right-angles to the carrying-arm 2, it being understood that the box 7 is rigid on the carrying-arm; and, therefore, the indicator's arm moves therewith and is constantly maintained at right-angle to the carrying-arm and parallel with the line of sight through the gun-pointer's telescope 1, which is considered for the present as parallel to the gun A. Consequently, any horizontal adjustment of the gun will swing the carrying-arm 2, which movement of the arm shifts the indicator-arm over the surface of the plotting-board, as the latter is kept oriented relative to a selected point on the compass 16, as indicated in dotted lines in Fig. 2.

The indicator consists of a housing 20 in slidable engagement with the indicator-arm 19 which extends through the housing, the latter having a pin 21 projecting through an elongated slot 22 in the sleeve of the indicator-arm and in constant engagement with the threads of the rotatable rod 23 disposed in said sleeve so that the indicator will be moved along the length of the indicator-arm by the rotation of said threaded rod 23. The rod 23 is actuated from or is otherwise actuated in synchronism with the horizontal pivotal movement of the range-finder's telescope 6, which is actuated, in the present instance, by crank-handle 24 on a worm shaft 25 in mesh with a gear 26 fast on the axis 27 of the telescope. A train of revolution-multiplying gears 28 are suitably arranged in the gear-box 7 to transmit the motion of the gear 26 to the threaded rod 23. This gearing 28 may be such as would multiply the revolutions of the rod 23 to any desired number according to the range of the gun on which the present device is to be used.

Thus, in finding the range of a target, the target is sighted by the gun-pointer's telescope 1 which is brought in position by the operation of the crank-handles G and I, which move and adjust the telescope 1 and the gun A in unison, as has been set forth, and causes the indicator-arm to move correspondingly over the plotting-board, which latter is being kept oriented. At the same time the range-finder's telescope 6 is brought in position to sight the target by an operation of the crank-handle 24, which operation also rotates the rod 23 to slide the indicator 20 on the indicator-arm 19. Therefore, the range of the target is indicated on the surface of the plotting board by the combined movement of the telescopes 1 and 6. The distance from the target is, however, determined by the degree of angle between the carrying-arm 2, or base of the right-angle triangle, and the line of sight of the telescope 6, which forms the hypotenuse of the triangle; and, in order that the indicator 20 may slide on the indicator-arm only to a degree in ratial proportion to the distance of the target from the gun so that the accurate map distance of the target may be indicated on the plotting board, the threads on the rod 23 increase in pitch (Fig. 9) as the distance per second of angle increases between the carrying arms 2 and the telescope 6. Obviously, the degree of angle between the arm 2 and the telescope 6 governs the degree of sliding movement of the indicator 20 on the indicator-arm. Of course, the pitch of the threads on the rod 23 vary according to the range of the gun with which it is used. It is contemplated to have the indicator 20 actually and directly trace the course of the target on the map or record sheet as it is moved over the plotting board in the manner just stated, and, also, to indicate on the map the distance traveled in certain predetermined periods of time. In the present embodiment, the indicator 20 has two needles 29 and 30 vertically arranged and slidably mounted therein (Fig. 13). To obtain a compact arrangement of the needles, the one 29 has a longitudinal bore in which is slidably disposed the needle 30 of a comparatively less diameter. The piercing ends of the needles project through the lower end of the indicator housing to normally lie in close proximity to the surface of the plotting board. A clock mechanism 20$^a$ is mounted on the indicator 20 to actuate said needle 29 for piercing the map, say, every five seconds and to actuate the needle 30 for piercing the map, say, every second, whereby the course of the target will be indicated by a line of perforations in the map, the space between the perforations representing the distance traveled by the target or the relative distance between the gun and the target, at predetermined intervals of time. In view of the relative size of the needles 29 and 30, the perforations made by them will, of course vary so that intervals of one second and five seconds are readily distinguishable. Therefore, assuming the target has been sighted moving from the gun in the direction of the arrow X, Fig. 2, its course will be shown on the plotting-board in the manner indicated at $v$, and the varying speed of the target or the relative distance between the gun and target, at predetermined intervals of time, can be easily estimated by reckoning with the varying distances between each perforation on the map.

Movement is transmitted from the clock mechanism 20$^a$ to the needles by a wheel 31 within the indicator 20 and rotatably connected with the clock mechanism and having two concentric cam-ribs 32 and 33 thereon which are engaged by the rollers 34 and 35, respectively, carried on the ends of the vertical rods 36 and 37, respectively. These rods are slidably mounted in the indicator and the rollers 34 and 35 are yieldingly held in engagement with the cam ribs by springs 38. Horizontal levers 39 connect the upper end of the needles 29 and 30 to the ends of the rods 36 and 37, respectively, and each is pivoted intermediate its ends to a swinging link 40 so as to permit a free unbinded movement of the lever 39. Each of the cam ribs 32 and 33 has a notch or a plurality of notches 41 therein, in which the rollers 34 and 35 are projected by the springs 38 as the wheel 31 is rotated by the clock mechanism. Thus, rods 36 and 37 are moved upwardly causing, through the medium of the levers 39, a downward movement of the needles to pierce the map. To effect a quick piercing operation of the needles, each notch 41 has the approaching edge thereof substantially perpendicular to the roller engaging edge of the ribs as at $m$ (Fig. 14) so that the springs 38 will instantaneously raise the rods 36 and 37 when a notch is encountered; and, the opposite edge of the notch is abruptly beveled, as at $n$, so that the rods are then immediately shifted downwardly and the needle withdrawn from piercing position. There are as many notches 41 in the cam ribs 32 and 33 as will effect a piercing operation of the larger needle 29 every five seconds and of the smaller needle 30 every second, or conversely if desired.

Thus far, it will be clear how the target and its course are plotted and that the plotting is the actual result of the combined adjustments of the gun-pointer's telescope 1 and the range finder's telescope 6, the adjustment of the former also being the corresponding adjustment of the gun.

Now, that the past course has been plotted, the future course is predicted by tracing or reckoning with the past course. This is done, preferably, by a flexible and extensible ruler 42 (Fig. 15) mounted on the indicator 20 and movable therewith. The ruler 42, in the present showing, is of a lazy-tong construction having pointers 43 and 44 on opposite ends thereof and is vertically pivoted at its longitudinal center 42$^a$ to a collar 45, which latter surrounds the housing of the indicator 20 adjacent the projecting ends of the needles 29 and 30 and is rotatably mounted for horizontal movement between the retaining guides 46. By this construction of the ruler 42, it will be seen that equal portions thereof extend on opposite sides of the needles 29 and 30 in both its extended and retracted positions, and that the ruler is rotatably shiftable relative to the indicator in order to facilitate proper measuring manipulations thereof. The measuring manipulations are made by one man, who may be termed the "plotter." and who bends the ruler to correspond with curvatures and angles of the course shown by the line of perforations. It is to be understood, however, that in manipulating the ruler, the portion thereof at one side of the pivot 42$^a$, say the half indicated by $o$, actually traces and lies coincident with the course traveled, and that the portion at the other side of said pivot 42$^a$ say the half indicated by $p$, lays the predicted course.

The predicted range is estimated by this invention, as is usually the case, from the past or traveled course. Therefore, should the past course be, say zig-zag, the portion *o* of the ruler is flexed to conform to the last curve or angle of travel indicated on the map and, since the plotter grasps the ruler with his right and left hands at both ends, and equal pressure is exerted on each end during flexing, resulting in both portions *o* and *p* being flexed to corresponding degrees, the portion *p* of the ruler representing the predicted course to be taken. Obviously, the ruler 42 would be manipulated in the same manner should the course shown by the perforations be straight or in arc. The ruler during use lies in a vertical plane so that it may be readily flexed and, when not in use, may be retracted and swung upwardly from the surface of the plotting-board by virtue of the pivot 42$^a$.

The mechanism, thus far described, finds the range of the target and plots the relative course between the gun and the target, and adjusts the gun on the target simultaneously with the telescopes.

In the event, however, that the target is moving relatively to the gun, the gun must, obviously, be advanced ahead of the course of the target just sufficiently to allow for the travel of the projectile to the target at its observed range in order that the projectile and target shall meet, as is well understood in the art. This is accomplished, in the present invention, by the gun-setter who adjusts or shifts the carrying-arm 2 to set the telescopes back off the target (independently of any adjustment of the gun caused by the gun-pointer) an amount corresponding to the amount which the gun should be advanced; and, the gun pointer seeing that his telescope is being moved off of the target thereupon operates the crank-handles G and I to bring his telescope on the target which operation simultaneously adjusts the gun to the proper degree in advance of the target, said gun being on the target prior to the shifting back of the telescopes. It is to be understood that when the gun is to be elevated to the predicted range the telescopes are depressed; that when the gun is to be depressed the telescopes are elevated; and that when the gun is to be adjusted laterally say to the right, the telescopes are adjusted laterally to the left. etc.

To carry this into practice in the present embodiment of the invention, the carrying-arm 2 is pivoted in the sleeve 3 by means of a ball and socket joint 47 and the sleeve has horizontally extending slots 3$^a$ at its end in which the bearing blocks 48 and 49 are slidably mounted, the ends of the carrying-arm extending through and being journaled in said blocks. This construction permits the carrying-arm to swing laterally for a limited degree about its pivot 47 independently of the movement of the gun-mount B, and will further permit the carrying-arm to be rotated about its longitudinal axis. Two shafts 50 and 51, one arranged on each side of the carrying-arm 2 and parallel therewith, are disposed under the plotting-board and have the crank-handles 52 and 53, respectively, on their outer ends. The shaft 50 is journaled in brackets 54 rigid on the arm 2 and has a pinion 55 on its opposite or inner end meshing with a segmental rack 56 vertically arranged on the bearing block 49. The shaft 51 is journaled in the bearing block 49 and is also supported by a collar 57 rotatable on the arm 2. The inner end of the shaft 51 carries a pinion 58 meshing with a segmental rack 59 horizontally arranged and rigid with the sleeve 3. Thus, it is manifest that when the crank-handle 52 is actuated the pinion 55 will travel over the rack 56 and partially rotate the carrying-arm 2 about its longitudinal axis in order to effect the depression and elevation of the telescope independently of the depressions and elevations caused by the gun-pointer; and, that an operation of the crank 53 moves the pinion 58 over the rack 59 and causes the carrying arm 2 to swing laterally about its pivot 47 in order to effect lateral adjustments of the telescopes independently of the lateral adjustment caused by an operation of the gun-pointer's crank G.

A gun-arm 60 is provided so that the aforesaid independent adjustment of the telescopes can be accurately made and is actuated in unison and synchronism with said independent adjustment of the telescopes by the crank-handle 52 and 53, which cause said adjustment of the telescopes. The gun-arm has a pointer 61 on its outer end to coincide with the predicted range and may be moved to any position on the plotting board, the handle 52 controlling its longitudinal movement over the board and the handle 53 controlling its lateral movement over the board.

The gun-arm is disposed below the indicator's arm 19 and is mounted in a housing 62 arranged within the gear-box 7 and extends through elongated slot 7$^a$ in the gear-box. The gun-arm consists of a straight bar preferably I-shaped in cross section and is slidably received in a correspondingly shaped passage or groove in the upper portion of the housing 62 which firmly maintains the gun-arm in position, and the under face of the bar has rack teeth 65 thereon for a purpose which will later appear, (Figs. 7 and 8). The housing 62 has a tubular supporting spindle 63 depending therefrom into the tubular extension 8 of the carrying-arm 2 where it is rotatably supported by a collar 64 rigid to the extension 8 (Fig. 5). The lower end of the tubular spindle 63 has a worm gear 66 in mesh with a worm wheel 67 fast on the shaft 50 so that the housing 62 will be rotated about its vertical axis to move the gun-arm laterally over the plotting-board in unison and in ratial proportion to correspond with the independent lateral adjustment of the telescopes, which is effected by the pinion 58 on the rack 59.

The longitudinal movement of the gun-arm is transmitted from the shaft 51 through a gearing generally indicated at 68 to a vertical shaft 70 rotatably mounted in the tubular spindle 63, and a suitable gearing is disposed in the housing 62 between the shaft 70 and gun-arm 60 that will accurately move the latter relative to the map in varying degrees according to the increase and decrease of distance per angle of elevation of the gun, the greatest distance per angle of elevation being at the commencement of the elevating adjustment of the gun and decreasing as it approaches its extreme elevation, and conversely. In the present instance, this latter gearing consists of a slidable rack-bar 71 (Figs. 5, 7 and 8) having a carriage 72 provided with a pin 72ª engaging the threads of the threaded shaft 73 having a gear 74 meshing with the gear 75 on the shaft 70. The rack 71 meshes with the pinion 76 on the shaft 77 having an enlarged gear 78 on one end thereof, preferably exteriorly of the housing 62, said gear 78 meshing with a pinion 79 on the shaft 80 having another pinion 81 thereon meshing with the teeth 65 on the gun-arm. The threads on the shaft 73 gradually decrease in pitch from one end to the other in order that the longitudinal movement of the gun-arm will decrease as the elevation of the gun increases, as just mentioned, for indicating the exact map distance of the target. Obviously, the pointer 61 of the gun-arm may be moved to any position on the plotting board to indicate the map position of the target by an operation of the crank-handles 52 and 53, which also set the telescopes back off the target in corresponding proportions to the map distance indicated by the gun-arm and in synchronism with the movement of the gun-arm, when it is desired to advance the gun to the predicted range. As the gun-arm is moved over the plotting board, an indicator 82 of any approved construction will register the time it takes the projectile to travel to the point indicated on the board by the pointer 61, the indicator, being positioned so that it can be easily read by the plotter. The indicator 82 is illustrated as being actuated by the longitudinal movement of the gun-arm from the shaft 80 through the worm gearing 83 and is supported by and movable with the housing 62.

The gearing 68 is such as will permit the carrying-arm 2 to rotate relatively to the shaft 51, and yet capable at all times to transmit motion from the shaft 51 to the shaft 70 as well as permit the shaft 51 to be supported from the carrying-arm 2. The gearing consists of a rack 84 meshing with a gear 69 on the shaft 70 and having a sleeve 85 at one end surrounding and splined on the arm 2. The sleeve 85 has the collar 57 surrounding it and rotatable thereon, however, held against longitudinal movement on the sleeve by a rib 86 accommodated in a slot in the collar, or by other suitable means. The collar has a threaded opening 87 in one side thereof through which the shaft 51 extends, a portion of said shaft being also threaded for engagement with the threads of the opening 87 to cause longitudinal movement of the rack 84 as the shaft is rotated.

Now, in the practical use of the invention, to sight a moving target the gun-pointer adjusts his telescope 1 on the target by an operation of the gun adjusting crank-handles G and I, which also move the indicator-arm 19 over the plotting board, said arm being parallel with the telescope 1 as explained. Simultaneously with the adjustment of the telescope 1, the range-finder operates the crank-handle 24 to move his telescope 6 on the target, resulting in the indicator 20 being moved on the arm 19 to indicate the exact position of the target on the plotting-board, the board being kept oriented by the crank-handle 17. As the telescopes 1 and 6 are kept on the moving target, it is obvious that the indicator 20 will trace the exact course of the target, in a manner indicated in Fig. 2, and that the needles 29 and 30 will record the course and indicate proportionally, the distance traveled in certain periods of time. Therefore, by observing the varying spaces between the perforations made by the needles, the increasing or decreasing speed of the vessel can be estimated. During this time the plotter will be flexing, or otherwise placing the ruler, so that the portion, say, o would coincide with the course as indicated by the line of perforations and whereby the portion p of the ruler would indicate an extension of the passed course, or in other words predict the future course to be taken by the target, as has been fully explained above.

Now, simultaneously with these operations the gun-setter operates the crank-handles 52 and 53 to move the gun-arm 60 so that the pointer 61 will substantially coincide with needles 29 and 30. This movement of the gun-arm will actuate the time indicator 82 to indicate to the plotter the time it will take the projectile to reach the target at its observed and indicated position. As is well understood in the art, the gun should be advanced ahead of the target to a degree allowed for the distance the target would travel in the time consumed by the flight of projectile, in order that the projectile and target shall meet. Assuming that the indicator 82 shows that it would take the projectile four seconds to reach the target at its present position, the plotter would adjust the ruler 42, by expanding or retracting it, so that the portion $o$ thereof would trace or embrace between its pointer 43 and the needles 29 and 30 that distance traveled by the target and indicated by the last four seconds of time. In view of the construction of the ruler, the portion $p$ thereof will be extended a distance equal to the distance at which the portion $o$ is extended, and therefore, the pointer 44 will indicate upon the map the position of the target in the next four seconds of time. After this prediction has been made the gun-setter operates the crank-handles 52 and 53 so as to bring the pointer 61 of the gun-arm to coincide with the position predicted by the pointer 44 of the plotter's ruler, which operation of the crank-handles 52 and 53 simultaneously moves or sets back the telescopes off the target to a degree corresponding to the movement or adjusted position of the gun-arm pointer 61. This adjustment caused by the operation of the crank-handles 52 and 53 may result in either elevating, depressing, or laterally adjusting the sights as has been fully set forth above. Now, it is the duty of the gun-pointer to constantly keep his telescope 1 on the target and when seeing that his sight is being moved off of the target (by the adjustment caused by the handles 52 and 53) immediately operates the gun-adjusting crank-handles G and I to bring his telescope in position to sight the target. This adjustment caused by the gun-pointer sets the gun A at a proper elevation or adjusts it laterally to the proper degree in advance of the target so as to deliver the projectile at the predicted position indicated on the map by the pointer 44 of the plotter's ruler 42.

It is to be understood that when all the instrumentalities of the above described apparatus have been put into operation and after the first prediction has been made, the adjustments caused by the gun-pointer, range-finder, plotter and gun-setter lose their order of sequence and become so interwoven as to render all of the adjustments in unison and synchronism with each other. The first predictions can be made great facility and celerity as the manipulations of the various parts follow in quick succession with no interval lapsing between them; however, the second cycle of the continued operation of the apparatus finds the operations of the various adjustable instrumentalities merged into one another and the gun A actuated as though it were controlled solely and directly by the operation of the gun-pointer. This is true by reason of the fact that the operators are keenly alert to their individual duties; for instance, the gun-pointer and range-finder constantly keep their telescopes upon the target and the gun-setter constantly observes the indicated and predicted range positions of the target and at the same time keeps the gun-arm pointer 61 coincident with one of the pointers 43 or 44, as the case may be, of the plotter's tracer. Therefore, any adjustment by the gun-setter to offset the telescopes is immediately and simultaneously rectified by a counter-adjustment by the gun-pointer keeping his telescope on the target and resulting in the ultimate and simultaneous adjustment of the gun A, as has been explained.

Windage and refraction of light are taken care of in the present instance by a suitable adjustment of the pointer 61 on the gun-arm 60. The pointer is adjusted to compensate for refraction of light by slidably mounting it in a block 88 for longitudinal adjustment with respect to the gun-arm 60 and by having a pinion 89, on the turn-shaft 90 journaled in the block, meshing with rack teeth 91 thereon, as clearly shown in Figs. 16 and 18. Windage is compensated for by having the block 88 laterally adjustable with respect to the gun arm 60. In the present instance, the outer end of the gun-arm has a cross-head 92 having rack-teeth 93 on one edge and receiving in grooved guide-ways similar ribs or projections on the block 88. A worm 94, on a turn-shaft 95 journaled in the block, meshes with the teeth 93 to cause said lateral adjustment of the pointer 61. A scale 96 is shown for the windage adjustment and a similar scale may be provided for light refraction adjustments. Fig. 19 shows a detail of a modified construction of gun-arm pointer. This form of a pointer $61^a$ is offset intermediate its end in order to facilitate its coöperation with the ruler pointers 43 and 44 and the needles 29 and 30, especially when the target is moving directly away or toward the gun.

A platform 97 is supported from the gun-mounting B and movable therewith. This platform is preferably co-extensive with the edge of the plotting board 9 and is to have the plotter, orientor and range-finder stationed thereon.

The foregoing clearly describes the invention, however, it is to be understood that certain changes in the construction, combination, organization and arrangement of elements herein set forth and shown may be made that fall within the legitimate scope of the appended claims.

What is claimed is:

1. In combination, a gun including a gun mount, and means mounted on the gun mount for constantly giving the range of a target and predicting a future range of the target, said means having connection with said gun for adjusting the latter in synchronism with the operation of said means, after the first cycle of operation whereby said gun is moved to proper position for delivering the projectile at the predicted range.

2. In combination, an adjustably mounted gun, and means disposed adjacent the gun for constantly giving the range of a target and for predicting the future range of target, said means having a connection with said gun for adjusting the latter in synchronism with the operation of said means, after the first cycle of operation whereby the gun is moved to proper position for delivering the projectile at the predicted range.

3. A range-finding device comprising, a supporting member rotatably adjustable intermediate its ends, a sight rigid at one end portion of the member, a movable sight at the other end portion of the member, a plotting-board carried on said member at said last mentioned end portion and capable of orientation, an arm connected to said member and adapted to be moved over the plotting board when said member is shifted, and an indicator on said arm and longitudinally adjustable thereon by the operation of said movable sight so as to indicate the map position of a target.

4. A range-finding device comprising a pivoted supporting member, a pair of spaced coöperating sights on said member, one rigidly mounted and the other movably mounted on the member, a plotting board mounted on said member adjacent the movable sight and being capable of orientation, and indicating means arranged to move over the board to indicate the lateral position of the target, when the supporting member is shifted, and to indicate the distance of the target by the movement of the movable sight.

5. A range-finding device comprising a pivoted supporting member, a pair of spaced coöperating sights on said member, one rigidly mounted and the other movably mounted on the member, a plotting board mounted on said member adjacent the movable sight and being capable of orientation, and indicating means arranged to move over the board to indicate the lateral position of the target, when the supporting member is shifted, and to indicate the distance of the target by the movement of the movable sight.

6. A range-finding and plotting device comprising a pivoted supporting member, a pair of spaced coöperating sights on said member, one rigidly mounted and the other movably mounted on the member, a plotting board mounted on said member adjacent the movable sight and being capable of orientation, and operable means for indicating on the board the position of the target at intervals of time, said indicating means being movable over the board to indicate the lateral position of the target, when the supporting member is shifted, and to indicate the distance of the target by the movement of said movable sight.

7. A range-finding and plotting device comprising a plotting board, an indicator movable over the board to indicate the position of a target, and coöperating and shiftable sights having operative connection with the indicator for causing the proper indicating operation of the indicator from the combined operation of the sights.

8. A range-finding and plotting device comprising a plotting board, an indicator movable over the board to indicate the position of the target and intermittently operable to record the positions of the target on the board and shiftable sights having operative connection with the indicator for causing the proper indicating movement of the latter from the combined operation of the sights thus causing the traveled course of a moving target to be plotted in intervals of time.

9. A range-finding device comprising, a relatively stationary sight and a relatively movable sight on a base line, the first of said sights forming the right angular leg of a triangle with base line and the last of said sights forming the hypotenuse thereof, a plotting board, an indicator movable over the board and having an operable connection with said movable sight to indicate on the board the distance of a target as the angle between the base line and movable sight varies.

10. A range finding device comprising, a base member, a relatively stationary sight and a relatively movable sight on the base member, said first sight forming the right-angular leg of a triangle with the base member and said last sight forming the hypotenuse thereof, a plotting board movable with the base line, and an indicator movable over the board and actuated by said movable sight to indicate on the board the distance of the target as the angle between the base line and the movable sight varies, said base member being shiftable about a vertical axis to permit an adjustment of said stationary sight on a target and having connection with said indicator, whereby the shifting of the base-member will cause the indicator to move over the board to indicate the relative lateral positions of the target thereon.

11. A range-finding device comprising, a base member, a relatively stationary sight and a relatively movable sight on the base member, said first sight forming the right angular leg of a triangle with base-member and said last sight forming the hypotenuse thereof, said base member being shiftable about a vertical axis to permit an adjustment of said stationary sight on a target, a plotting board pivotally mounted about the axis of the movable sight for orientation, and an indicator movable over the board and actuated by said movable sight to indicate on the board the distance of the target as the angle between the base member and movable sight varies, said indicator having connection with said base member, whereby the shifting of the latter will cause the indicator to move over the board to indicate the relative lateral positions of the target thereon.

12. A range-finding and plotting device comprising a plotting board, an indicator movable over the board to indicate the position of a target, shiftable sights having operative connection with the indicator for causing the proper indicating operation of the indicator from the combined operation of the sights, a gun-arm movable over the board relative to the indicator, and means for operating the arm.

13. A range-finding and plotting device comprising a plotting board, an indicator movable over the board to indicate the position of a target, sight mechanism having operative connection with the indicator for causing the proper indicating operations of the latter, said indicator consisting of means to record on the board the indicated positions of the target, and means operable to trace and measure the traveled course recorded on the board and to predict the future course.

14. A range-finding and plotting device comprising a plotting board, an indicator movable over the board to indicate the position of a target, sight mechanism having operative connection with the indicator for causing the proper indicating operations of the latter, said indicator consisting of means to record on the board the indicated positions of the target, and means operable to trace and measure the traveled course recorded on the board and to predict the future range, and a gun arm movable over the board relatively to the indicator to coincide with the predicted range, and means for operating the arm.

15. A range-finding device comprising, a carrying arm movable about a substantially vertical axis, a pair of sight members on the arm, one being stationarily disposed on the arm and having its line of sight normally parallel with the gun while the other is movably disposed on the arm, means for shifting said arm whereby said first sight is traversed, a plotting board, an indicator arranged in coöperative relation with the board and being shiftable over the board in one direction by the movement of said arm and shiftable over the board at an angle to its first mentioned direction of movement by the movement of the movable sight, whereby the combined observations of the sights operate the indicator to indicate on the board the position of a target.

16. In a range-finding and predicting device, the combination with an adjustably mounted gun, of a horizontal carrying-arm mounted to move about a vertical axis with the lateral adjustment of the gun and to move about its longitudinal axis with the elevation and depression of the gun, a sight member stationarily mounted on said arm and having its line of sight normally parallel with the gun, a plotting board pivotally mounted on the arm for orientation, an indicator-arm connected to the carrying-arm to be shifted laterally over the board by the lateral movement of the carrying arm, an indicator adjustably mounted on the indicator-arm and including means for recording on the board at predetermined intervals of time, a second sight member pivotally mounted on the carrying-arm, an operable connection between said second sight and the indicator for adjusting the latter on the indicator-arm to indicate on the board in ratial proportions the distance of a target, a gun-arm mounted to move over the board and having a pointer thereon, a time indicating means controlled by the movement of said gun-arm for indicating the time to be consumed by the projectile in its flight to the position indicated by the gun-arm pointer, a flexible rule on the indicator for tracing the course plotted thereby and adapted to lay the further course and predict the range of the target allowing time for the flight of the projectile, said carrying-arm permitting of a second movement about its vertical and longitudinal axes independently of its first mentioned movements caused by the adjustment of the gun, means for simultaneously shifting said gun-arm laterally over the board and causing said independent movement of the carrying-arm about its vertical axis, means for simultaneously shifting the pointer of the gun-arm over the board at an angle to its lateral movement and causing said independent movement of the carrying-arm about its longitudinal axis, said independent movements of the carrying-arm causing the stationarily mounted sight to be set back off the target in proportion to the movement of the gun-arm when the latter is moved to the predicted position.

17. In a range-finding and predicting device, the combination with an adjustably mounted gun, of a horizontal carrying-arm mounted to move about a vertical axis with the lateral adjustment of the gun and to move about its longitudinal axis with the elevation and depression of the gun, a sight member stationarily mounted on the carrying-arm and having its line of sight normally parallel with the gun, a plotting board pivotally mounted on said arm for orientation, an indicator arm connected to the carrying-arm to be shifted laterally over the board by the lateral movement of said carrying-arm, an indicator adjustably mounted on the indicator-arm and including means for recording on the board, a second sight member pivotally mounted on the carrying-arm, an operable connection between said second sight and the indicator for adjusting the latter on the indicator-arm to indicate on the board in ratial proportions the distance of a target, a gun-arm mounted to move over the board and having a pointer thereon, means for tracing the course plotted by the indicator and to lay the further course and predict the range of the target, said carrying-arm permitting of a second movement about its vertical and longitudinal axes independently of its first mentioned movements caused by the adjustment of the gun, means for simultaneously shifting said gun arm laterally over the board and causing said independent movement of the carrying-arm about its vertical axis, means for simultaneously shifting the pointer of the gun-arm over the board at an angle to its lateral movement and causing said independent movement of the carrying-arm about its longitudinal axis, said independent movements of the carrying-arm causing the stationarily mounted sight to be set back off the target in proportion to the movement of the gun-arm, when the latter is moved to the predicted position.

18. A device of the kind described comprising, in combination with a gun mounted for horizontal and vertical adjustment, a horizontal carrying-arm mounted to move about a vertical axis with the horizontal adjustment of the gun and to move about its longitudinal axis with the elevation and depression of the gun, a sight rigid on the carrying-arm and having its line of sight normally parallel with the gun, a plotting board carried on said arm and capable of orientation, an indicator having connection with the carrying-arm to move therewith and over the plotting-board, a second sight member pivotally supported on the carrying-arm and having an operable connection with said indicator for adjusting the latter relatively to said arm, whereby the position of the target is indicated on the board, means for tracing the course plotted by the indicator and to predict the further range of the target, a gun-arm mounted to move over the plotting-board and having a pointer thereon, the mounting of said carrying-arm being such as to permit of a movement about its vertical and longitudinal axes independently of its movements caused by the adjustment of said gun, means for simultaneously shifting said gun-arm laterally over the board and causing said independent movement of the carrying - arm about its vertical axis, means for simultaneously shifting the gun-arm over the board at an angle to its lateral movement and causing said independent movement of the carrying-arm about its longitudinal axis, said independent movements causing the rigidly mounted sight to be moved back off the target in proportion to the movement of the gun-arm, when the latter is moved to the predicted range on the board.

19. A device of the kind described comprising, in combination with a gun mounted for horizontal and vertical adjustment, a horizontal carrying-arm mounted to move about a vertical axis with the horizontal adjustment of the gun and to move about its longitudinal axis with the elevation and depression of the gun, a sight rigid on the carrying-arm and having its line of sight normally parallel with the gun, a plotting board carried on said arm and capable of orientation, an indicator having connection with the carrying-arm to move therewith and over the plotting-board, a second sight member pivotally supported on the carrying-arm and having an operable connection with said indicator for adjusting the latter on said arm, whereby the position of the target is indicated on the board, means for tracing the course plotted by the indicator and to predict the further range of the target, a gun-arm mounted to move over the plotting board and having a pointer thereon, the mounting of said carrying-arm being such as to permit of a movement about its vertical and longitudinal axes independently of its movements caused by the adjustment of said gun, means for simultaneously shifting said gun-arm laterally over the board and causing said independent movement of the carrying-arm about its vertical axis, means for simultaneously shifting the gun-arm over the board at an angle to its lateral movement and causing said independent movement of the carrying - arm about its longitudinal axis, said independent movements causing the rigidly mounted sight to be moved back off the target in proportion to the movement of the gun-arm, when the latter is moved to the predicted range on the board, both said means for simultaneously adjusting the gun-arm and carrying-arm being adapted to be actuated in unison.

20. The combination with an adjustably mounted gun, of a horizontal carrying-arm movable about a substantially vertical axis with the lateral adjustment of the gun and movable about its longitudinal axis with vertical adjustment of the gun, a pair of sight members on the arm, one being rigidly disposed and having its line of sight normally parallel with the gun while the other sight is movably disposed, a plotting board, an indicator arranged in coöperative relation with the board and being shiftable over the board in one direction by the movement of said arm and shiftable over the board at an angle to the first mentioned direction of movement by the movement of the movable sight, whereby the combined observations of the sights operate the indicator to indicate the position of a target on the board, means for tracing the course plotted by the indicator and to predict the further range of the target, a gun-arm mounted to move over the plotting board and having a pointer thereon, the mounting of said carrying-arm being such as to permit of a movement about its vertical and longitudinal axes independently of its movements caused by the adjustment of said gun, means for simultaneously shifting said gun-arm laterally over the board and causing said independent movement of the carrying-arm about its vertical axis, means for simultaneously shifting the gun-arm over the board at an angle to its lateral movement and causing said independent movement of the carrying-arm about its longitudinal axis, said independent movements causing the rigidly mounted sight to be moved back off the target in proportion to the movement of the gun-arm, when the latter is moved to the predicted range on the board.

21. The combination with a gun adjustably mounted, of a carrying-arm adjustable with the gun, a pair of sight members on the arm, one being rigid and the other movably disposed on the arm, said rigid sight having its line of sight normally parallel with the gun, a plotting board, an indicator arranged in coöperative relation with the board and being shiftable over the board in one direction by the movement of said arm and shiftable over the board at an angle to its first mentioned direction of movement by the movement of the movable sight, whereby the combined observations of the sight operate the indicator to indicate the position of a target on the board, means for predicting on the board a future range of the target, means mounted on said arm for coöperating with the predicted range, and mechanism connected with said last mentioned means for causing an adjustment of said rigid sight independently of the gun back off the target proportionally to the movement of said last means; thereupon bringing said rigid sight on the target by an adjustment of said sight and gun in unison, the gun is positioned to deliver the projectile at the predicted range.

22. In a device of the kind described, the combination with a gun adjustably mounted, of a shiftable member provided with a base line, a relatively rigid and a relatively movable sight spaced apart on said member, the rigid sight being normally parallel with the gun and forming the right-angular leg of a triangle with the base line, said movable sight forming the hypotenuse of the triangle, a plotting board supported on the base line, an indicator movable over the board and actuated by said movable sight to indicate on the board the distance of the target as the angle between the base line and the movable sight varies, said base line member being adjustable in unison with the gun and having connection with said indicator to move the latter over the board to indicate the lateral positions of the target when the gun is moved about a vertical axis, means for predicting on the board a future range of the target, means mounted on said base line member for coöperating with the predicted range, and mechanism connected with said last mentioned means for causing an adjustment of said rigid sight independent of the gun back off the target proportionally.

23. In a device of the kind described, the combination with a gun adjustably mounted, of a base member providing a base-line, a relatively rigid and a relatively movable sight on the base member, said rigid sight being normally parallel with the gun and forming the right-angular leg of a triangle with the base line, said movable sight forming the hypotenuse of the triangle, said base member being adjustable in unison with the gun, a plotting board pivotally mounted about the axis of the movable sight for orientation, an indicator movable and actuated by said movable sight to indicate on the board the distance of the target as the angle between the base-line and movable sight varies, said indicator having connection with said base line causing the indicator to be moved over the board to indicate the lateral positions of the target, means for predicting on the board a future range of the target, means mounted on said arm for coöperating with the predicted range, and mechanism connected with said last mentioned means for causing an adjustment of said rigid sight independently of the gun back off the target proportionally to the movement of said last means, thereupon bringing said rigid sight on the target by an adjustment of said sight and gun in unison, the gun is positioned to deliver the projectile at the predicted range.

24. In a device of the kind described, the combination with a gun adjustably mounted, of a plotting board, an indicator movable over the board to indicate the position of a target, shiftable sights having operative connection with the indicator for causing the proper indicating operation of the indicator from the combined positions of the sights, one of said sights being movable in unison with the gun, means for predicting on the board a future range of the target, means for coöperating with the range predicted on the board, and mechanism connected with said last mentioned means for causing an adjustment of the last mentioned sight independently of the gun back off the target in proportion to the movement of said last means.

25. In a device of the kind described, the combination with a gun adjustably mounted, of a plotting board, an indicator movable over the board to indicate the position of a target, sight mechanism having operative connection with the indicator for causing the proper indicating operations of the latter, said mechanism including a sight movable in unison with the gun, said indicator consisting of means to record on the board the indicated positions of the target, means adapted to trace and measure the traveled course recorded on the board and to predict the future range, a gun-arm movable over the board relatively to the indicator to coincide with the predicted range, and mechanism connected with said gun-arm for causing an adjustment of the sight, which is movable with the gun, independently of the gun back off the target in proportion to the movement of said gun-arm.

26. The combination with a gun adjustably mounted, of a supporting member adjustable with the gun, a pair of spaced coöperating sights on said member, one rigidly mounted and the other movably mounted on the member, a plotting board mounted on said member adjacent the movable sight and being capable of orientation, said rigid sight having its line of sight normally parallel with the gun, indicating means arranged to move over the board to indicate the lateral position of the target by traversing the gun and to indicate the distance of the target by an adjustment of the movable sight, means for predicting on the board a future range of the target from the indicated positions, means to coincide with the predicted range, mechanism connected with said last mentioned means for causing an adjustment of said rigid sight independently of the gun back off the target in ratio to the movement of said last means.

27. A device of the kind described comprising, in combination with a gun mounted for horizontal and vertical adjustment, a horizontal carrying-arm mounted to move about a vertical axis with the horizontal adjustment of the gun and to move about its longitudinal axis with the elevation and depression of the gun, a sight rigid on the carrying-arm and having its line of sight normally parallel with the gun, a plotting board carried on said arm and capable of orientation, an indicator having connection with the carrying-arm to move therewith and over the plotting board, a second sight member pivotally supported on the carrying-arm and having an operable connection with said indicator for adjusting the latter relatively to said arm, whereby the position of the target is indicated on the board.

28. The combination with a gun and a laterally adjustable mount therefor, a carrying-arm mounted on the gun-mount and having connection with the gun to be moved about its longitudinal axis with elevation and depression of the gun, a rigid sight on the arm, a plotting board on said arm and capable of orientation, other sighting means on the arm for obtaining the range of a target and to predict a future range, a gun-arm movable over the board to coincide with the predicted range, said carrying-arm being adapted to be adjusted about its longitudinal axis and about a vertical axis independently of the adjustment of the gun, and means for moving the gun-arm and causing such independent adjustments of said carrying-arm in ratial proportion to the movement of the gun-arm.

29. The combination with a gun and a laterally adjustable mount therefor, a sleeve horizontally and rotatably mounted in the gun-mount, said sleeve having connection with the gun so as to be rotated by the elevation and depression of the gun, a carrying arm extending through the sleeve and having a universal connection with the latter for supporting the arm and permitting a secondary lateral and rotatable adjustment thereof independently of the adjustment of the gun, mechanism carried on the carrying-arm for obtaining the range of a target, means to coincide with range obtained, and means for moving said last means and causing such independent adjustments of said carrying-arm in ratial proportion to the movement of the gun-arm.

30. The combination with a gun and a laterally adjustable mount therefor, a sleeve horizontally and rotatably mounted in the gun-mount, said sleeve having connection with the gun so as to be rotated by the elevation and depression of the gun, a carrying arm extending through the sleeve and having a universal connection with the latter for supporting the arm and permitting a secondary lateral and rotatable adjustment thereof independently of the adjustment of the gun, a rigid sight on the arm, a movable sight on the arm, a plotting board on the arm and capable of orientation, an indicator movable with said arm and further operable by the movement of said movable sight to indicate the range of a target on the board, a gun-arm to coincide with range, and means for moving said gun-arm and causing said independent adjustment of said carrying-arm in ratial proportion to the movement of the gun-arm.

31. The combination with a gun and a laterally adjustable mount therefor, a sleeve horizontally and rotatably mounted in the gun-mount, said sleeve having connection with the gun so as to be rotated by the elevation and depression of the gun, a carrying arm extending through the sleeve and having a universal connection with the latter for supporting the arm and permitting a secondary lateral and rotatable adjustment thereof independently of the adjustment of the gun, a rigid sight on the arm, other sighting means on the arm for obtaining the range of a target and to predict a future range, a gun-arm movable to coincide with the ranges obtained, means for simultaneously shifting said gun-arm and causing said independent lateral movement of the said carrying-arm, and means for simultaneously shifting the gun-arm at an angle to its first mentioned movement and causing said independent rotatable movement of the carrying-arm, said independent movements causing the rigidly mounted sight to be moved back off the target in proportional ratio to the movement of the gun-arm, when the latter is moved to a predicted range.

32. The combination with a gun and a laterally adjustable mount therefor, a sleeve horizontally and rotatably mounted in the gun-mount, said sleeve having connection with the gun so as to be rotated by the elevation and depression of the gun, a carrying arm extending through the sleeve and having a universal connection with the latter for supporting the arm and permitting a secondary lateral and rotatable adjustment thereof independently of the adjustment of the gun, a rigid sight on the arm, other sighting means on the arm for obtaining the range of a target and to predict a future range, a gun-arm movable to coincide with the range obtained, means for simultaneously shifting said gun-arm and causing said independent lateral movement of the said carrying-arm, and means for simultaneously shifting the gun-arm at an angle to its first mentioned movement and causing said independent rotatable movement of the carrying-arm, said independent movements causing the rigidly mounted sight to be moved back off the target in proportional ratio to the movement of the gun-arm, when the latter is moved to a predicted range, both said means for simultaneously adjusting the gun-arm and carrying-arm being adapted to be actuated in unison.

33. A device of the kind described including a plotting board, an indicator movable over the board and consisting of means for recording at intervals of time the position of the indicator relative to the board.

34. A device of the kind described including a plotting board, an indicator movable over the board, means on the indicator for recording at greater or lesser intervals of time the position of the indicator relative to the board, the recording at greater intervals being distinguishable from the recording at lesser intervals.

35. In a device of the kind described, a movably mounted indicator, perforators mounted on the indicator of varying sizes, a clock mechanism, and operative means connecting said clock mechanism and said perforator, whereby the perforators of one size will be operated at greater intervals of time and the perforators of another size will be operated at lesser intervals.

36. A device of the kind described including a plotting board, an indicator movable over the board and consisting of means for recording at intervals of time the position of the indicator relative to the board, and a flexible and extensible member adapted to coincide with the line recorded.

37. A device of the kind described including a plotting board, an indicator movable over the board and consisting of means for recording at intervals of time the position of the indicator relative to the board, and a flexible and extensible member secured to the indicator and constructed to project to equal degrees on opposite sides of the indicator, when said member is operated, for the purposes set forth.

38. A device of the kind described including a plotting board, an indicator movable over the board and consisting of means for recording at intervals of time the position of the indicator relative to the board, and an extensible ruler of a lazy-tong construction centrally pivoted to the indicator and adapted to be flexed laterally.

39. In combination, a gun including a gun mount, operable instrumentalities for constantly giving the range of a target and predicting a future range therefor, and an operative connection between said instrumentalities and gun for adjusting the latter by the operations of the former to properly position the gun for delivering projectiles at the predicted range.

40. In combination, a gun including a gun mount, means for constantly observing, giving the range and predicting a future range for a target, said means being mounted on the gun mount, and an operative connection between said means and gun for adjusting the latter by the operations of the former, whereby the gun is properly positioned for delivering projectiles at the predicted range.

41. In a device of the character described, the combination with a gun adjustably mounted, of shiftable means for sighting a target, means actuated by said sight means to indicate the position of the target, means for predicting a future range for the target, and means to coöperate with said predicted range and operable to cause the gun to be adjusted to proper position for delivering a projectile at the predicted range.

42. In a device of the kind described, the combination with a gun adjustably mounted, of shiftable means for sighting a target, means actuated by said sight means to indicate and record the positions of the target during its course, means to coöperate with the recorded course for predicting a future range for the target, and means to cooperate with said predicted range and operable to cause the gun to be adjusted to proper position for delivering the projectile at the predicted range.

43. In a device of the kind described, the combination with a gun adjustably mounted, of shiftable means for sighting a target, means actuated by said sight means to indicate the position of the target, means for predicting a future range for the target, means for coöperating with the predicted range, and mechanism connected with said last mentioned means for causing an adjustment of said sight means independently of the gun back off the target proportionally to the movement of said last means, whereby further observation of the target will cause the gun to be positioned to deliver a projectile at a predicted range.

In testimony whereof I affix my signature in the presence of two witnesses.

LEONARD A. SMITH.

Witnesses:
R. C. L. GRAHAM,
J. B. WISE, Jr.